United States Patent
Cherlet et al.

(10) Patent No.: US 12,459,491 B2
(45) Date of Patent: Nov. 4, 2025

(54) INDEPENDENT CLUTCH AND POWER DEVICE CONTROL OF A MULTI-MODE ELECTRO-MECHANICAL INFINITELY VARIABLE TRANSMISSION OPERATING WITHOUT ELECTRIC ENERGY STORAGE DEVICE

(71) Applicant: Dana Belgium N.V., Flanders (BE)

(72) Inventors: Simon Cherlet, Bruges (BE); Nicolas Lenaerts, Bruges (BE); Stijn Goossens, Erpe-Mere (BE); Bert Hannon, Bruges (BE)

(73) Assignee: DANA BELGIUM N.V., Bruges (BE)

( * ) Notice: Subject to any disclaimer, the term of this patent is extended or adjusted under 35 U.S.C. 154(b) by 614 days.

(21) Appl. No.: 17/661,887

(22) Filed: May 3, 2022

(65) Prior Publication Data
US 2023/0356708 A1 Nov. 9, 2023

(51) Int. Cl.
*H02K 7/14* (2006.01)
*B60W 20/20* (2016.01)
*B60W 20/30* (2016.01)
*B60W 20/40* (2016.01)

(52) U.S. Cl.
CPC ............ *B60W 20/40* (2013.01); *B60W 20/20* (2013.01); *B60W 20/30* (2013.01); *B60W 2510/0657* (2013.01); *B60W 2510/0666* (2013.01); *B60W 2510/081* (2013.01); *B60W 2510/083* (2013.01); *B60W 2510/085* (2013.01)

(58) Field of Classification Search
CPC .................................................... B60W 20/20
USPC ............................................................ 318/3
See application file for complete search history.

(56) References Cited

U.S. PATENT DOCUMENTS

| | | |
|---|---|---|
| 9,132,736 B1 | 9/2015 | Shukla et al. |
| 11,247,563 B2 | 2/2022 | Van Dingenen et al. |
| 2016/0208718 A1* | 7/2016 | Kim .................... F02D 41/0087 |
| 2017/0008507 A1 | 1/2017 | Shukla et al. |
| 2021/0018072 A1 | 1/2021 | Steinberger et al. |
| 2021/0171009 A1* | 6/2021 | Lechlitner ......... B60W 30/1882 |
| 2021/0364065 A1 | 11/2021 | Van Dingenen et al. |

FOREIGN PATENT DOCUMENTS

| | | |
|---|---|---|
| EP | 1660787 B1 | 8/2013 |

OTHER PUBLICATIONS

Hannon, B. et al., "Power System for a Vehicle," U.S. Appl. No. 17/454,553, filed Nov. 11, 2021, 17 pages.
Goossens, S. et al., "Systems and Methods for Torque Output Control," U.S. Appl. No. 17/457,389, filed Dec. 2, 2021, 33 pages.
Goossens, S. et al., "Systems and Methods for Vehicle Hill Control," U.S. Appl. No. 17/457,612, filed Dec. 3, 2021, 34 pages.
Van Dingenem, J. et al., "Transmission With Power Take-Off," U.S. Appl. No. 17/646,267, filed Dec. 28, 2021, 20 pages.

* cited by examiner

*Primary Examiner* — Erick D Glass
(74) *Attorney, Agent, or Firm* — McCoy Russell LLP (57) ABSTRACT

A method and system for operating a multi-mode electro-mechanical infinitely variable transmission (EMIVT) that is coupled to an engine and includes two electric machines is described. In one example, operating modes of the two electric machines are controlled without regard to vehicle speed and system conditions that are external to the two electric machines.

7 Claims, 6 Drawing Sheets

_(12)_ United States Patent US 12,459,491 B2

INDEPENDENT CLUTCH AND POWER DEVICE CONTROL OF A MULTI-MODE ELECTRO-MECHANICAL INFINITELY VARIABLE TRANSMISSION OPERATING WITHOUT ELECTRIC ENERGY STORAGE DEVICE

TECHNICAL FIELD

The present disclosure relates to controlling a multi-mode electro-mechanical infinitely variable transmission. Electric machines of a multi-mode electro-mechanical infinitely variable transmission may be controlled solely based on their speed and power output irrespective of clutch states of the variable transmission.

BACKGROUND AND SUMMARY

A vehicle may include a multi-mode electro-mechanical infinitely variable transmission (EMIVT). In some embodiments, the EMIVT may be selectively electrically coupled to an electric energy storage device, while in other embodiments the EMIVT may not be coupled to an electric energy storage device. Stability of a DC voltage bus that allows electric power to be exchanged between two electric machines of the EMIVT and between the electric machines and an electric energy storage device, if the electric energy storage device is present or electrically coupled to the electric machines, may be desired to ensure proper operation of the electric machines and to reduce a possibility of degrading the electric machines. The stability of the DC voltage bus may be provided by maintaining a voltage of the DC voltage bus at a desired or target voltage during vehicle operation. An amount of electric power that is delivered to the DC voltage bus may be increased or decreased to maintain the desired or target voltage at the DC voltage bus. To achieve stability of the DC voltage bus, set points for power devices coupled to the EMIVT may be generated. In addition, clutches of the EMIVT may be controlled so that the EMIVT operates in desired or optimal modes. U.S. Pat. No. 9,132,736 describes a way to control a voltage of a DC voltage bus for an EMIVT. In particular, an engine is operated in a speed control mode and a first electric machine EM1 is operated in a voltage mode while a second electric machine EM2 is operated in a torque mode. Alternatively, the engine may be operated in the speed control mode, EM1 operates in torque mode, and EM2 operates in voltage mode. The selection of modes for EM1 and EM2 is based on whether the EMIVT is operating in an output coupled mode or an input coupled mode. The EMIVT is operated in output coupled mode when vehicle speed is less than a threshold speed and the EMIVT is operated in input coupled mode when vehicle speed is greater than the threshold speed. However, the mode switching strategy described in the '736 patent may reduce driveline performance and efficiency. Additionally, the mode switching strategy described in the '736 patent requires the engine to operate in a speed control mode, which may require significant tuning for each vehicle configuration. Accordingly, it may be desirable to provide a way of controlling an EMIVT that is not constrained by the limitations of the strategy that is described in the '736 patent.

The inventors herein have recognized the above-mentioned issues and have developed a method for operating a driveline, comprising: operating an engine in a torque control mode while switching control modes of a first electric machine and a second electric machine in response to a speed of the first electric machine and a speed of the second electric machine.

By operating an engine in a torque control mode and switching control modes of first and second electric machines in response to speeds of the first and second electric machines, it may be possible to provide the technical result of simplified control of an EMIVT. Further, the operating envelope of the EMIVT may be extended so that efficiency and performance of a driveline may be improved.

The present description may provide several advantages. In particular, the approach herein may simplify control strategy for an EMIVT. Further, the approach may improve performance and efficiency of a driveline that includes an EMIVT. In addition, power sources of the driveline are not operated in speed control modes so that vehicle drivability may be improved.

It may be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

DETAILED DESCRIPTION

Figure 1:
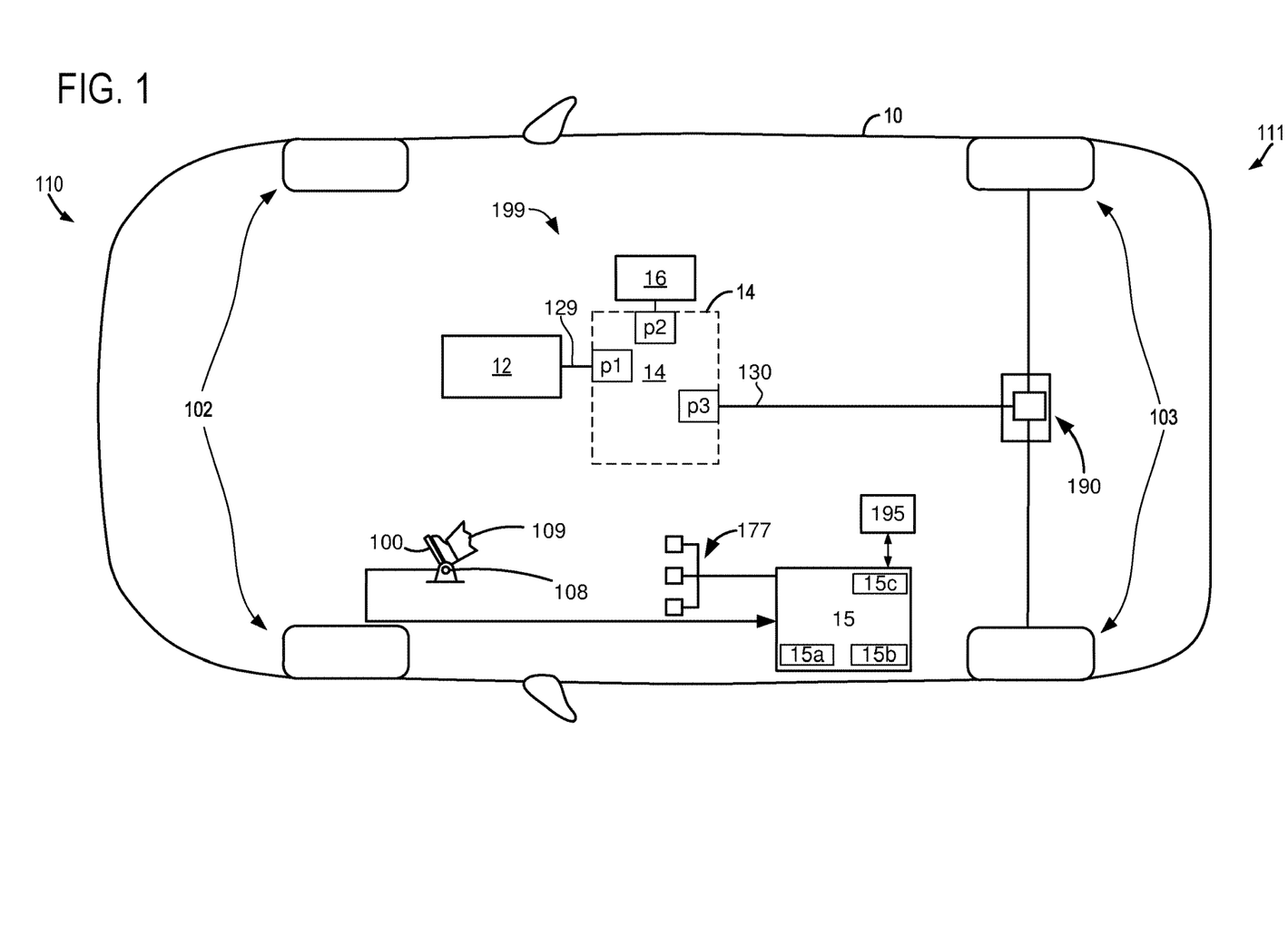
FIG. 1 is a schematic diagram of an example vehicle driveline that includes a transmission.
Figure 2:
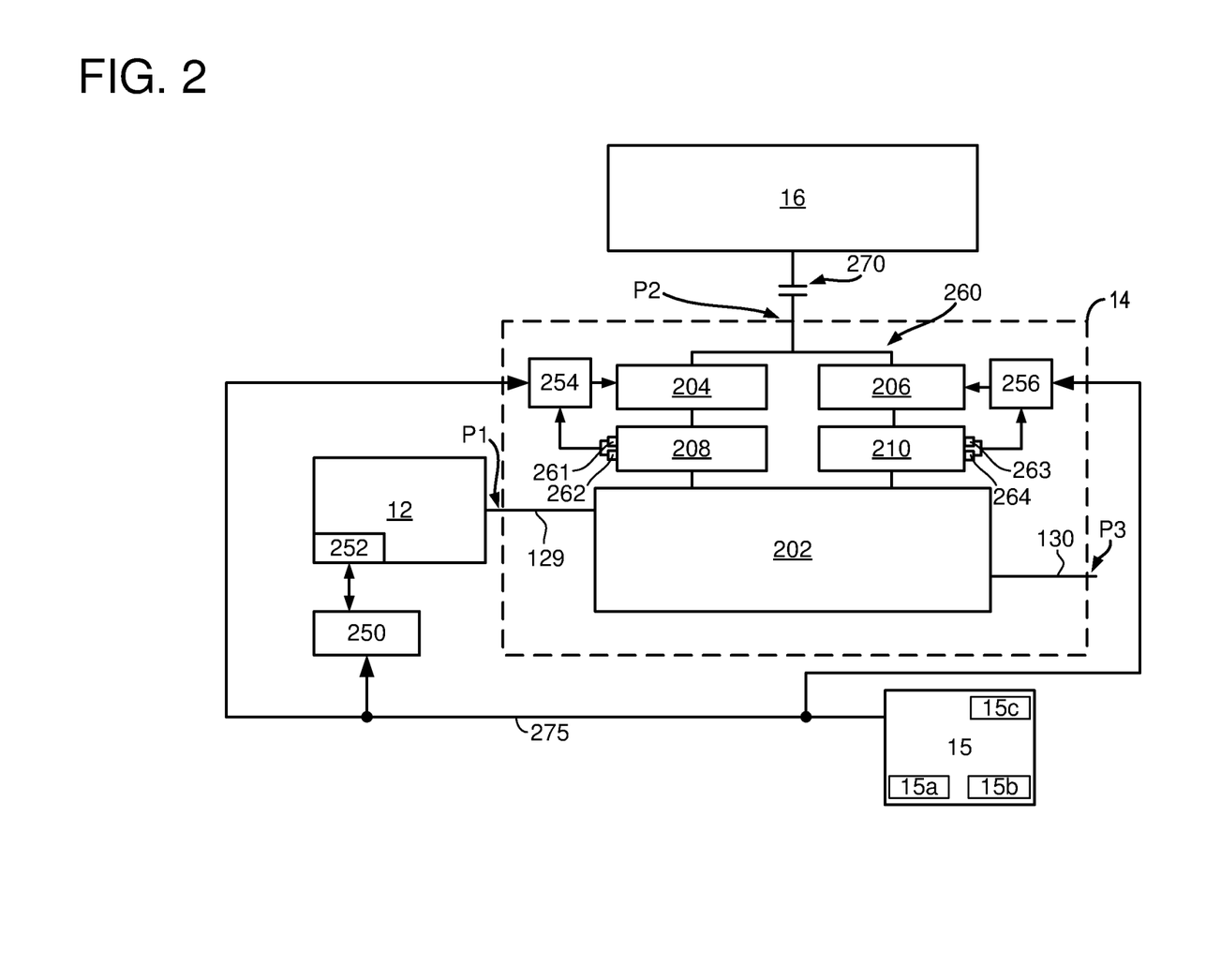
FIG. 2 a block diagram of an example transmission.
Figure 3:
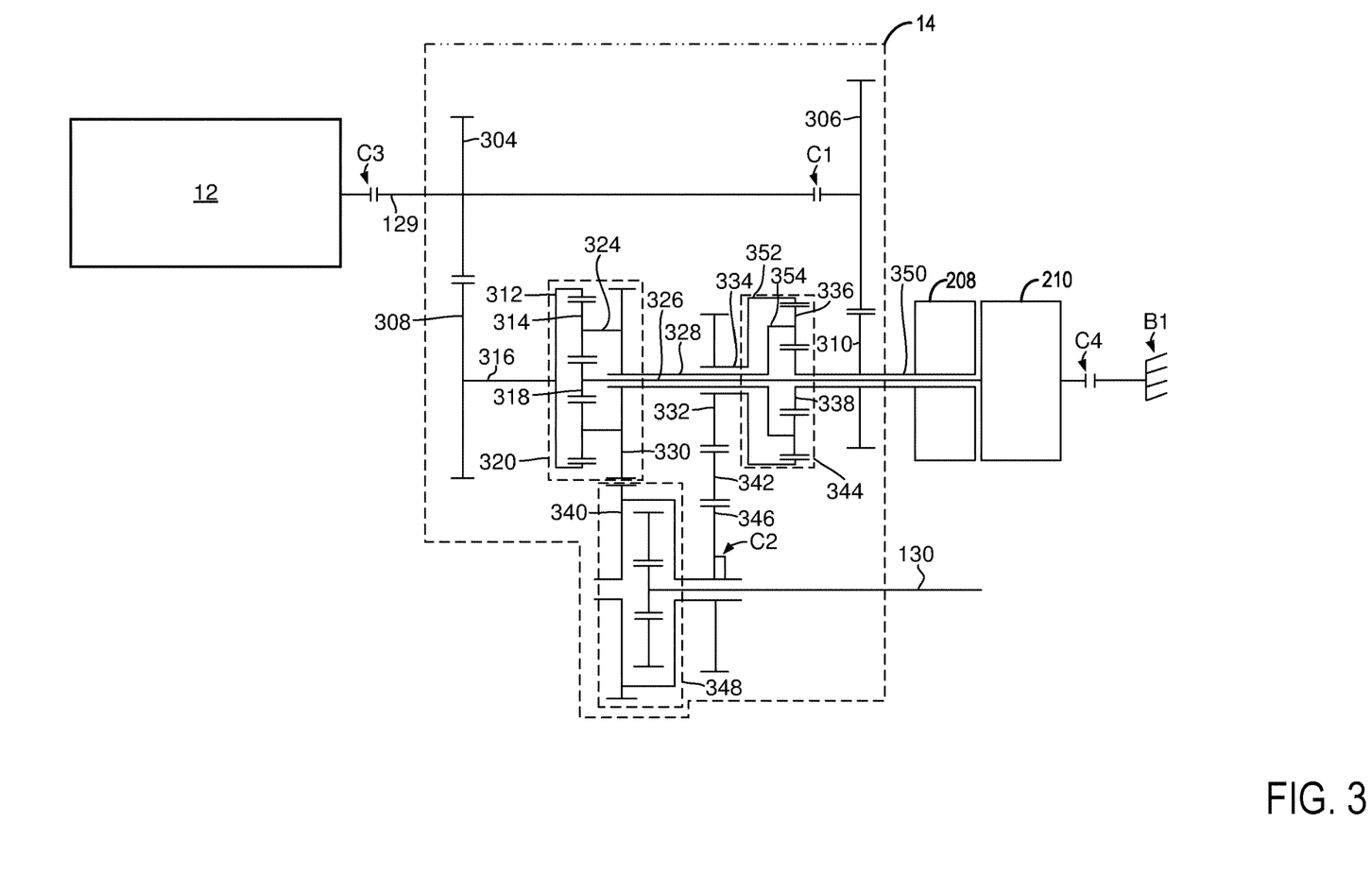
FIG. 3 shows a detailed schematic of a transmission.
Figure 4:
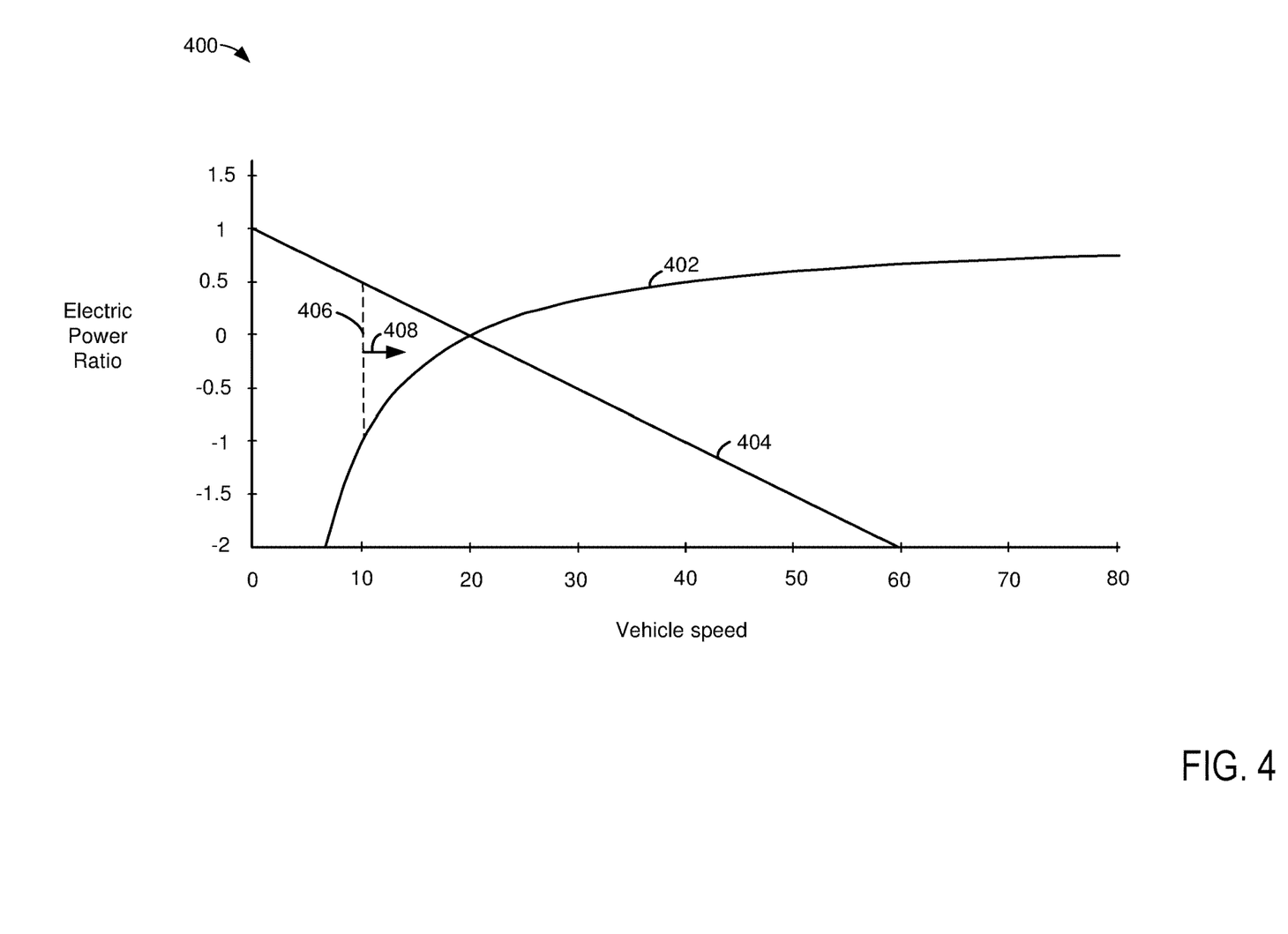
FIG. 4 shows a plot of electric power ratios for an EMIVT.

The following description relates to systems and methods for operating a multi-mode electro-mechanical infinitely variable transmission (EMIVT). The EMIVT may include two electric machines. One of the electric machines may be input coupled or output coupled. The EMIVT may be decoupled from an electric energy storage device, or it may not be coupled to or selectively coupled to an electric energy storage device. The EMIVT may be incorporated into a vehicle as shown in FIG. 1. The EMIVT may include a plurality of ports to couple the EMIVT to sources of power and to consumers of power as shown in FIG. 2. The EMIVT may be configured as shown in FIG. 3 or in an alternative configuration. The EMIVT may have electric power ratios as shown in FIG. 4. The EMIVT may be controlled according to the method of FIG. 5. Operating states of the EMIVT may be adjusted according to the method of FIG. 6.

FIG. 1 illustrates an example vehicle driveline 199 included in vehicle 10. Vehicle 10 includes a front side 110 and a rear side 111. Vehicle 10 includes front wheels 102 and rear wheels 103. Vehicle 10 includes a propulsion source 12 (e.g., internal combustion engine) that may selectively provide propulsive effort to rear axle 190. In other examples, the propulsion source 12 may provide propulsive effort only to a front axle (not shown) and rear axle 190 or only to a front axle. Propulsion source 12 is shown mechanically coupled to transmission 14 via transmission input shaft 129. In some examples, the engine's crankshaft (not shown) may be coupled to transmission input shaft 129. Transmission 14 routes mechanical power from transmission output shaft 130 to rear axle 190. In this example, transmission 14 includes three ports P1-P3. Ports 1 and 3 are mechanical power ports and port 2 is an electric power port.

Optional electric energy storage device 16 (e.g., a traction battery or capacitor) may provide electric power to electric machines included in transmission 14. The traction battery may provide electric power to propel the vehicle 10. Transmission 14 may be operated via controller 15. In this example, controller 15 is configured to command an engine controller (not shown), electric machine controllers (not shown), clutches (not shown), and brakes (not shown) within transmission 14. Controller 15 may switch operating modes of transmission 14 via adjusting states of clutches and brakes as described herein with regard to FIG. 3. Controller 15 may also receive a position of a driver demand pedal 100 from driver demand pedal position sensor 108, which may be an input for determining the operating state of transmission 14. The driver demand pedal 100 and the driver demand pedal position sensor 108 may react to movement caused by human driver 109. Controller 15 may receive data from sensors 177. Sensors 177 may include, but are not limited to a vehicle speed sensor, a transmission temperature sensor, transmission input shaft speed sensor, transmission output shaft speed sensor, and ambient temperature sensor. Controller 15 includes a processor 15a for executing instructions, read-only memory 15b, and random access memory 15c. In this example, controller 15 may communicate with one or more controllers via a controller area network (CAN) as shown in FIG. 2. Alternatively, controller 15 may operate as a sole controller that receives inputs from engine sensors and transmission sensors including electric machine sensors. Controller 15 may receive input from and provide output to human/machine interface 195 (e.g., touch screen display, pushbuttons, etc.).

Referring now to FIG. 2, a block diagram of transmission 14 is shown. Transmission 14 is shown with 3 ports that are labeled P1-P3. Port 1 is configured to receive mechanical energy from a propulsion source 12 (e.g., internal combustion engine). Alternatively, port 1 may deliver mechanical energy to propulsion source 12. Port 2 is a port that receives electrical power from electric energy storage device 16. Alternatively, port 2 may provide electrical power to electric energy storage device 16. Electrical ports 2 are shown coupled to a first inverter 206 and a second inverter 204 via DC voltage bus 260. DC voltage bus 260 may be comprised of conductors that may allow the transfer of electrical power between first electric machine 210, second electric machine 208, and optional electric energy storage device 16. First inverter 206 may convert direct current (DC) to alternating current (AC). AC may be delivered from first inverter 206 to first electric machine 210. Likewise, AC may be delivered from second inverter 204 to second electric machine 208. Alternatively, first electric machine 210 may deliver AC power to first inverter 206 and second electric machine 208 may deliver AC power to second inverter 204. First electric machine 210 and second electric machine 208 may supply mechanical power to gears, clutches, and brakes 202. Gears, clutches, and brakes 202 may transfer mechanical power to output ports P1 and P3. Output port P3 may transfer mechanical power to rear wheels 103. Contactor (e.g., switch) 270 may selectively couple optional electric energy storage device 16 to DC voltage bus 260.

Propulsion source 12 may be controlled via engine controller 250. Engine controller 250 may adjust positions of one or more torque actuators 252 (e.g., throttle, cam phase actuator, fuel injector, ignition system, etc.) to operate propulsion source 12 in a torque control mode. In torque control mode, propulsion source 12 may generate a torque output that follows a torque demand that may be generated or followed via engine controller 250. Engine speed may increase or decrease while the engine outputs the commanded torque. Engine controller 250 may communicate with driveline controller 15 via controller area network 275.

First electric machine 210 and first inverter 206 may be controlled via first electric machine controller 256. First electric machine controller 256 may adjust opening and closing of switches within first inverter 206 to control voltage and electric current supplied to first electric machine 210. Alternatively, first electric machine controller 256 may also adjust opening and closing of switches within first inverter 206 to control a voltage and electric current supplied to DC voltage bus 260 via first electric machine 210. First electric machine controller 256 may receive speed of first electric machine 210 via speed sensor 263. First electric machine controller 256 may receive electric current of first electric machine 210 via current sensor 264.

Second electric machine 208 and second inverter 204 may be controlled via second electric machine controller 254. Second electric machine controller 254 may adjust opening and closing of switches within second inverter 204 to control voltage and electric current supplied to second electric machine 208. Alternatively, second electric machine controller 254 may also adjust opening and closing of switches within second inverter 204 to control a voltage and electric current supplied to DC voltage bus 260 via second electric machine 208. Second electric machine controller 254 may receive speed of second electric machine 208 via speed sensor 261. Second electric machine controller 254 may receive electric current of second electric machine 208 via current sensor 264.

Turning now to FIG. 3, a detailed view of one example of transmission 14 (e.g., an EMIVT) is shown. However, it may be appreciated that the methods described herein may be applied to EMIVTs of different configurations. For example, the methods described herein may be applied to an EMIVT of the type shown in U.S. Patent Publication No. 2021/0018072, filed Jul. 14, 2020, which is hereby fully incorporated by reference in its entirety for all intents and purposes.

In this example, propulsion source 12 is shown coupled to clutch C3. Clutch C3 is coupled to transmission input shaft 129. Clutch C3 may selectively couple transmission input shaft 129 to propulsion source 12. Gear 304 is coupled to transmission input shaft 129 and Gear 304 is coupled to gear 308. Gear 308 is coupled to shaft 316 and shaft 316 is coupled to ring gear 312. Ring gear 312 is part of first planetary gear set 320. First planetary gear set 320 includes planetary gears 314 and a sun gear 318. Sun gear 318 is shown coupled to first electric machine 210 via shaft 326. Planetary gears 314 couple sun gear 318 to ring gear 312. Carrier 324 supports planetary gears 314 and carrier 324 is coupled to shaft 328 via gear 330. Gear 330 is also coupled to gear 340 of third planetary gear set 348.

Transmission input shaft 129 may be selectively coupled to gear 306 via clutch C1. Gear 306 is coupled to gear 310 and gear 310 is coupled to shaft 350. Second electric machine 208 and sun gear 338 of second planetary gear set 344 are also coupled to shaft 350. First electric machine may be coupled to optional brake B1 via clutch C4.

Second planetary gear set 344 includes a ring gear 352 that is coupled to shaft 334. Shaft 334 is coupled to gear 332 and gear 332 is coupled to idler gear 342. Idler gear 342 is coupled to gear 346 and gear 346 may be selectively coupled to third planetary gear set 348 via clutch C2. Second planetary gear set 344 includes planetary gears 336 and a sun gear 338. Sun gear 338 is shown coupled to second electric machine 208 via shaft 335. Planetary gears 336 couple sun gear 338 to ring gear 352. Carrier 354 supports planetary gears 336 and carrier 354 is coupled to shaft 328. Third planetary gear set 348 is coupled to transmission output shaft 130.

Input coupled mode is a mode wherein an electric machine is coupled to the transmission's input shaft and the internal combustion engine, where the internal combustion engine's speed is decoupled from vehicle speed. The transmission of FIGS. 1-3 may be engaged in input coupled mode when clutch C1 is engaged and clutch C2 is disengaged, thereby coupling the second electric machine 208 to the propulsion source 12. Transmissions of other configurations may engage input coupled mode via operating their clutches and brakes to couple an electric machine to the transmission's input shaft (e.g., a shaft that is coupled directly to an internal combustion engine), where the internal combustion engine is decoupled from vehicle speed.

Output coupled mode is a mode wherein an electric machine is coupled to the transmission's output shaft or shafts. Thus, the speed of the electric machine in output coupled mode is proportional to vehicle speed. The transmission of FIGS. 1-3 may be engaged in output coupled mode when clutch C1 is disengaged and clutch C2 is engaged, thereby coupling the second electric machine 208 to the third planetary gear set and the transmission output shaft. Transmissions of other configurations may engage output coupled mode via operating their clutches and brakes to couple an electric machine to the transmission's output shaft (e.g., a shaft at a transmission port that delivers power to vehicle wheels). Input coupled mode couples a same electric machine to the transmission input shaft as is coupled to the transmission output shaft in output coupled mode, the second electric machine in the system of FIGS. 1-3 for example.

The first electric machine and the second electric machine may both be operated in a voltage or voltage control mode, but the first electric machine and the second electric machine may not be simultaneously engaged in voltage control mode so that stacked control loops may be avoided. Voltage control mode is a mode wherein an electric machine and its associated inverter operate to maintain a desired or target voltage of the DC voltage bus. An electric machine in voltage mode may maintain a balance of power between the first and second electric machines. The electric machine that is in the voltage control mode may provide all of the power for the electric machine that is operating in torque control mode plus power to offset electric power losses. An electric machine that is operating in voltage control mode may operate as a motor (e.g. consuming electric power from the DC voltage bus and the electric machine that is operating in a generator mode) or a generator (e.g., generating electric power and delivering the electric power to the DC voltage bus and the electric machine that is operating in the motor mode) to maintain the DC voltage bus voltage. For the system of FIGS. 1-3, the first electric machine may operate in a voltage control mode while the second electric machine is operating in torque control mode. Alternatively, the first electric machine may operate in the torque control mode while the second electric machine is operating in the voltage control mode.

The first electric machine and the second electric machine may both be operated in a torque control mode, but the first electric machine and the second electric machine may not be simultaneously operated in torque control mode so that stacked control loops may be avoided. Torque control mode is a mode wherein an electric machine and its associated inverter operate to maintain a desired or target torque output of the electric machine via a mechanical output of the electric machine (e.g., a shaft). An electric machine in torque mode may deliver a requested or target amount of torque to the transmission. An electric machine that is operating in torque control mode may operate as a motor (e.g. providing mechanical output torque to a transmission) or a generator (e.g., consuming torque from the transmission).

Thus the system of FIGS. 1-3 may provide for a driveline, comprising: a transmission including a first electric machine, a second electric machine, a planetary gear set, and a DC voltage bus; an internal combustion engine coupled to the transmission; and a controller including executable instructions stored in non-transitory memory that cause the controller to operate the first electric machine in a first electric machine voltage control mode and the second electric machine in a second electric machine torque control mode in response to a speed of the second electric machine being less than a second threshold speed for voltage regulation of the DC voltage bus and a speed of the first electric machine being greater than a first threshold speed for voltage regulation of the DC voltage bus while operating the internal combustion engine in an engine torque control mode. In a first example, the driveline further comprises additional instruction to operate the second electric machine in a second electric machine voltage control mode and the first electric machine in a first electric machine torque control mode in response to the speed of the second electric machine being greater than the second threshold speed for voltage regulation of the DC voltage bus and the speed of the first electric machine being less than the first threshold speed for voltage regulation of the DC voltage bus while operating the internal combustion engine in the engine torque control mode. In a second example that may include the first example, the driveline further comprises additional instruction to operate the first electric machine in the first electric machine voltage control mode and the second electric machine in the second electric machine torque control mode in further response to the second electric machine being power limited for voltage regulation of the DC voltage bus. In a third example that may include one or both of the first and second examples, the driveline further comprises additional instruction to operate the second electric machine in the second electric machine voltage control mode and the first electric machine in the first electric machine torque control mode in further response to the first electric machine being power limited for voltage regulation of the DC voltage bus. In a fourth example that may include one or more of the first through third examples, the driveline further comprises a vehicle that includes the driveline, and where the engine is operated in the engine torque control mode while the vehicle is operated at zero speed and at all times when the vehicle is traveling at speeds above zero speed. In a fifth example that may include one or more of the first through fourth examples, the driveline includes where the controller is a driveline controller. In a sixth example that may include one or more of the first through fifth examples, the driveline further comprises an engine controller configured to adjust one or more actuators such that the internal combustion engine generates a torque requested via the driveline controller.

Referring now to FIG. 4, a plot of electric power ratios for input coupled and output coupled modes of the EMIVT is shown for when an engine coupled to the EMIVT is operated at a constant speed. The electric power ratio is a ratio between the amount of electric power flowing through the DC voltage bus of the EMIVT and the amount of mechanical power provided by the engine to the EMIVT. The vertical axis represents electric power ratios for the EMIVT shown in FIG. 3. The horizontal axis represents vehicle speed in miles/hour. Trace 402 represents the electric power ratios for the EMIVT when the EMIVT is operating in an input coupled mode. Trace 404 represents the electric power ratios for the EMIVT when the EMIVT is operated in an output coupled mode. Line 406 represents a vehicle speed at which the prior art shifts the EMIVT from output coupled mode to input coupled mode and vice-versa. In particular, the prior art shifts the EMIVT from output coupled mode (trace 404) to input coupled mode (trace 402) at 10 miles/hour. However, operating the EMIVT according to the method of FIG. 5 allows the EMIVT to change modes at higher vehicle speeds while operating with higher efficiency. Optimal efficiency of the driveline may be achieved by operating the EMIVT with power ratios that are positive and close to a value of zero. It may be desirable to avoid operating the EMIVT with negative power ratios and power ratios that are greater than one since operating the EMIVT with these power ratios recirculates power in the EMIVT and reduces EMIVT efficiency. Thus, the vehicle speed at which the EMIVT changes from output coupled mode to input coupled mode may be moved as indicated by arrow 408, thereby increasing the operating range of the EMIVT when the EMIVT is operated according to the method of FIG. 5.

Figure 5:
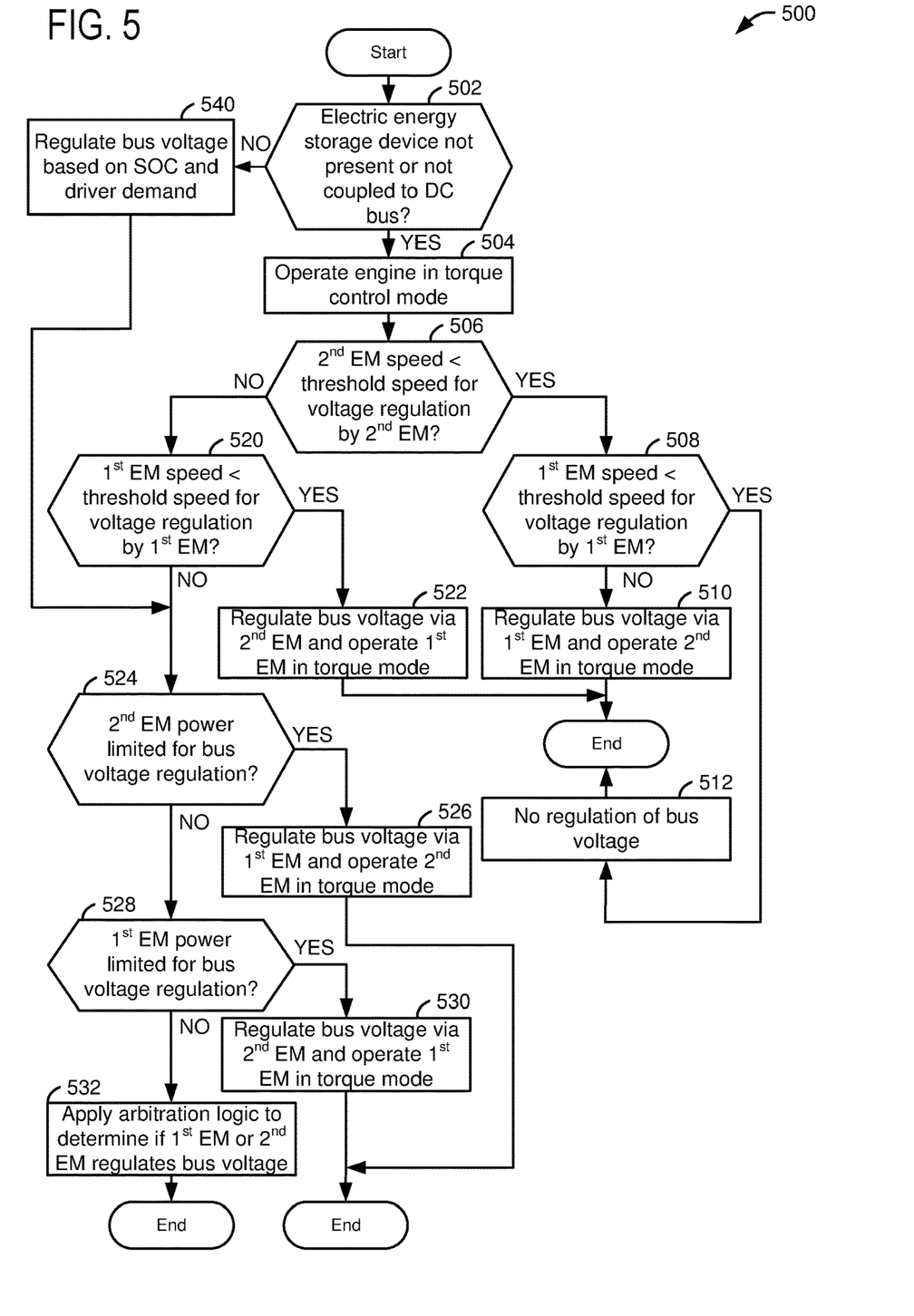
FIG. 5 shows a flowchart of a method for operating an EMIVT.

Referring now to FIG. 5, an example method for operating an EMIVT transmission is shown. Method 500 may be at least partially implemented as executable instructions stored in controller memory in the system of FIGS. 1-3. Method 500 may be performed in cooperation with the system of FIGS. 1-3. Further, method 500 may include actions taken in the physical world to transform an operating state of the system of FIGS. 1-3. The method of FIG. 5 operates without the engine and the first and second electric machines from operating in speed control modes, which may simplify system calibration and improve vehicle drivability. Additionally, the modes of the power devices (e.g., the engine and the first and second electric machines) is not coupled to the operating states of the EMIVT clutches.

At 502, method 500 judges whether or not an electric energy storage device for storing electric charge from the EMIVT and delivering electric charge to the EMIVT is present in the vehicle or if an electric energy storage device is present but not coupled to the EMIVT. If an electric energy storage device is not present or present but not coupled to the EMIVT, the answer is yes and method 500 proceeds to 504. Otherwise, the answer is no and method 500 proceeds to 540.

At 540, method 500 controls the electrical degree of freedom, which is electric energy storage device current control when the answer is no at 502. To control the electrical current to the electrical storage device, there is no speed threshold to consider since the inverter (e.g., 204 and/or 206 of FIG. 2) will not do voltage control, instead the driveline controller (e.g., element 15 of FIG. 2) will control the electrical device current in a closed loop manner by requesting torque setpoints to the electric machine which has been determined to control the electrical degree of freedom via FIG. 5. Therefore, if an electric energy storage device is present (answer at 502 is no), method 500 proceeds to 524 to identify which electric machine (e.g., 208 or 210 of FIG. 2) driveline controller will apply to control the electric current that flows to the electric energy storage device. When the electric energy storage device is connected to the DC voltage bus 260, control need not be very precise to provide desired operation of transmission 14. As such, the driveline controller 15 has sufficient capacity to perform closed loop electric energy storage device electric current control. In addition, the inverters do not have an interface for the degree of electric freedom. Rather, the degree of electric freedom is an interface of the electric energy storage device (element 16 of FIG. 2) so a different higher level controller is applied because the inverter has no knowledge of electric energy storage device electric current, which is desired to be controlled. Method 500 proceeds to 524 to determine which electric machine will be applied to control the electrical degree of freedom.

At 504, method 500 operates the internal combustion engine in a torque control. The internal combustion engine may be operated in torque control at all times that the engine is running. In torque control mode, the engine is commanded to follow a requested or desired torque while engine speed is permitted to increase or decrease. The engine torque may be adjusted via adjusting an engine torque actuator such as a throttle, cam phase adjuster, fuel injector, turbocharger waste gate, etc. The engine torque may be adjusted via an engine controller, and the engine controller may follow torque commands that are issued via a driveline controller. Such an arrangement may allow different engines from different manufacturers and differently configured engines to be controlled via a common control strategy in driveline controllers. Further, operating the engine in torque control allows the engine to operate in common with classical engine control approaches so that unique engine control strategies need not be developed and calibrated. The engine is operated only in torque control mode and not in speed control mode for all vehicle speeds (e.g., vehicle speeds from zero to maximum vehicle speed) and all driver demand torque or power requests. Method 500 proceeds to 506. The engine may always be controlled by the driveline controller generating a torque setpoint to the engine.

At 506, method 500 judges whether or not a speed of the second electric machine is less than a threshold electric machine speed for DC voltage bus voltage regulation by the second electric machine. The second electric machine may have a minimum speed below which voltage regulation by the second electric machine may be unstable. In other words, the second electric machine may not be able to provide and maintain a requested voltage at the DC voltage bus below the threshold electric machine speed. The second electric machine may be able to provide voltage regulation to the DC voltage bus when a speed of the second electric machine is greater than the threshold electric machine speed. If method 500 judges that a speed of the second electric machine is below the threshold speed for voltage regulation by the second electric machine, the answer is yes and method 500 proceeds to 508. Otherwise, the answer is no and method 500 proceeds to 520.

At 508, method 500 judges whether or not a speed of the first electric machine is less than a threshold electric machine speed for DC voltage bus voltage regulation by the first electric machine. The first electric machine may have a minimum speed below which voltage regulation by the first electric machine may be unstable. The threshold speed for voltage regulation by the first electric machine may be different than the threshold speed for voltage regulation by the second electric machine. The first electric machine may be able to provide voltage regulation to the DC voltage bus when a speed of the first electric machine is greater than the threshold electric machine speed. If method 500 judges that a speed of the first electric machine is below the threshold speed for voltage regulation by the first electric machine, the answer is yes and method 500 proceeds to 512. Otherwise, the answer is no and method 500 proceeds to 510.

At 510, method 500 regulates voltage of the DC voltage bus via the first electric machine and operates the second electric machine in torque control mode. Method 500 proceeds to exit.

At 512, method 500 provides no regulation of DC voltage bus voltage. Neither the first electric machine nor the second electric machine are operated in voltage control mode since both the first electric machine and the second electric machines are at speed that are less than their respective threshold speed for voltage regulation. Method 500 proceeds to exit.

At 520, method 500 judges whether or not a speed of the first electric machine is less than a threshold electric machine speed for DC voltage bus voltage regulation by the first electric machine. The first electric machine may have a minimum speed below which voltage regulation by the first electric machine may be unstable. If method 500 judges that a speed of the first electric machine is below the threshold speed for voltage regulation by the first electric machine, the answer is yes and method 500 proceeds to 522. Otherwise, the answer is no and method 500 proceeds to 524.

At 522, method 500 regulates voltage of the DC voltage bus via the second electric machine and operates the first electric machine in torque control mode. Method 500 proceeds to exit.

At 524, method 500 judges whether or not the second electric machine is power limited for voltage regulation of the DC voltage bus by the second electric machine. The actual electric power of the second electric machine may be estimated by multiplying the actual torque of the second electric machine with the actual speed of the second electric machine that the inverter reports to the driveline controller via CAN. The upper and lower electric power limits of the second electric machine may be determine by multiplying the actual speed and the respective actual upper and lower torque limits (reported by the inverter (e.g. via CAN) or parameterized (e.g. in a table that may be referenced by electric machine speed)) of the second electric machine. The second electric machine speed sign may be applied to determine the upper power limit and the lower power limit. By subtracting the actual power from the upper power limit and the lower power limit, and by determining whether the difference is smaller than a parameterized value, it may be determined that a the second electric machine is power limited. If method 500 judges that the second electric machine is power limited, the answer is yes and method 500 proceeds to 526. Otherwise, the answer is no and method 500 proceeds to 528.

At 526, method 500 regulates voltage of the DC voltage bus via the first electric machine and operates the second electric machine in torque control mode. Method 500 proceeds to exit.

At 528, method 500 judges whether or not the first electric machine is power limited for voltage regulation of the DC voltage bus by the first electric machine. The actual electric power of the first electric machine may be estimated by multiplying the actual torque of the first electric machine with the actual speed of the first electric machine that the inverter reports to the driveline controller via CAN. The upper and lower electric power limits of the first electric machine may be determine by multiplying the actual speed and the respective actual upper and lower torque limits (reported by the inverter (e.g. via CAN) or parameterized (e.g. in a table that may be referenced by electric machine speed)) of the first electric machine. The first electric machine speed sign may be applied to determine the upper power limit and the lower power limit. By subtracting the actual power from the upper power limit and the lower power limit, and by determining whether the difference is smaller than a parameterized value, it may be determined that a the first electric machine is power limited. If method 500 judges that the first electric machine is power limited, the answer is yes and method 500 proceeds to 530. Otherwise, the answer is no and method 500 proceeds to 532.

At 530, method 500 regulates voltage of the DC voltage bus via the second electric machine and operates the first electric machine in torque control mode. Method 500 proceeds to exit.

At 532, method 500 applies arbitration logic to determine if the first electric machine regulates voltage of the DC voltage bus or if the second electric machine regulates voltage of the DC voltage bus. In one example, method 500 may determine which electric machine regulates voltage of the DC voltage bus based on operating conditions of the first and second electric machines. For example, a factor in the arbitration logic may be the controllability of the voltage level. It may be determined that the electric machine that is operating at a higher speed needs to provide smaller torque correction to correct the electrical power balance (the voltage level). This may allow method 500 to provide a smaller torque margin (from the actual to the limit) for that electrical machine, which may be less likely to be torque or power limited when providing torque corrections when a swap of voltage regulation machine may be needed. Additionally, the electric machine operating at the higher speed may need smaller torque corrections, which implies (depending on conditions) smaller torque deviations on the transmission output shaft and the input shaft, which may improve vehicle drivability. Thus, applying a first vs second electrical machine speed map, zones may be determined (parameterized) to prefer one or the other (or none, hold whatever electric machine is currently in voltage regulation, to avoid unmercenary voltage control swaps and hunting) electric machine as voltage control machine.

Thus, method 500 may cause the first and second electric machines to change operating modes based solely on speed and power limitations or constraints of the first and second electric machines. The operating modes of the first and second machines are selected and applied irrespective of system operating conditions such as vehicle speed, driver demand torque/power, EMIVT clutch states, and input/output coupling modes. As a result, the EMIVT may be operated with fewer constraints, may provide much greater functionality and operational flexibility, and simplifies control of the EMIVT.

Figure 6:
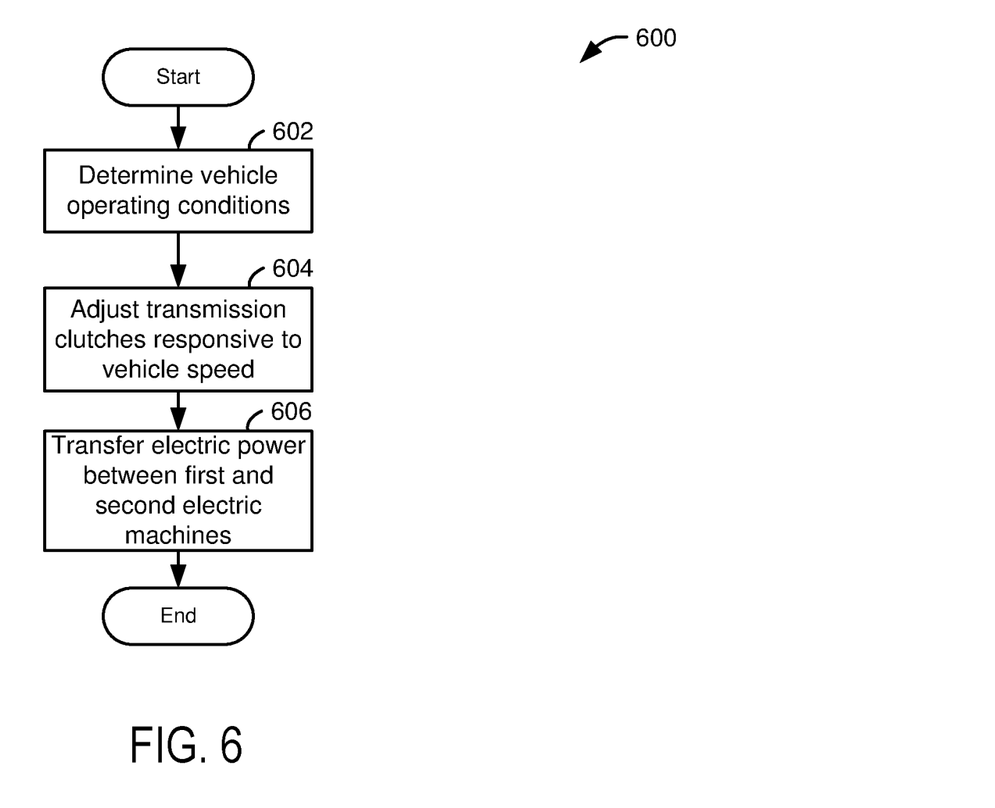
FIG. 6 shows a flowchart of a method for changing operating states of an EMIVT.

Referring now to FIG. 6, a method for operating an EMIVT is shown. Method 600 may be performed at the same time that method 500 is performed. Method 600 may be performed in cooperation with method 500. In addition, method 600 may be performed under the same vehicle operating conditions as method 500. Method 600 may also be at least partially implemented as executable instructions stored in controller memory in the system of FIGS. 1-3. Further, method 600 may include actions taken in the physical world to transform an operating state of the system of FIGS. 1-3. Additionally, method 600 may be performed in cooperation with the system of FIGS. 1-3.

At 602, method 600 determines vehicle operating conditions. Vehicle operating conditions may be determined via the sensors described herein. Method 600 may determine vehicle operating conditions including but not limited to vehicle speed and driver demand torque or power. Method 600 proceeds to 604.

At 604, method 600 adjusts the operating state of the EMIVT. In one example, clutches and brakes of the EMIVT may be applied or released according to vehicle operating conditions. For example, the driveline controller may engage clutch C2 and disengage clutch C1 when vehicle speed is less than a threshold speed. Method 600 may engage clutch C1 and disengage clutch C2 when vehicle speed is greater than the threshold speed. Method 600 may also adjust the operating states of the clutches and brakes (e.g., engaged or disengaged) in response to a vehicle drive mode selector (not shown) so that the driveline may be operated in low range forward, high range forward, and reverse. Method 600 proceeds to 606.

At 606, method 600 exchanges power between the first and second electric machines when an electric energy storage device is not coupled to the DC voltage bus. Method 600 may exchange power between the first and second electric machines according to the operating state of the EMIVT, driver demand, and other system operating conditions while an electric energy storage device (e.g., a traction battery) is decoupled from the EMIVT. For example, the first electric machine may be in a generator mode supplying electric power to the second electric machine when the EMIVT is engaged in output coupled mode while the vehicle speed is increasing. The first electric machine may be in a motoring mode supplying mechanical power to the EMIVT and consuming electric power from the second electric machine that is operating in a generator mode. Method 600 proceeds to exit.

Note that in some examples, steps 604 and 606 may be performed in parallel. This is a consequence of decoupling the electric machine control from the transmission clutch control.

Thus, the methods of FIGS. 5 and 6 provide for a method for operating a driveline, comprising: operating an engine in a torque control mode while switching control modes of a first electric machine and a second electric machine in response to a speed of the first electric machine and a speed of the second electric machine. In a first example, the method includes where the control modes of the first and second electric machines include a voltage control mode and a torque control mode. In a second example that may include the first example, the method further comprises switching control modes of the first electric machine and the second electric machine in response to the first electric machine being power limited. In a third example that may include one or both of the first and second examples, the method further comprises switching control modes of the first electric machine and the second electric machine in response to the second electric machine being power limited. In a fourth example that may include one or more of the first through third examples, the method further comprises providing no regulation of a DC voltage bus voltage in response to the speed of the first electric machine being less than a first threshold speed and the speed of the second electric machine being less than a second threshold speed. In a fifth example that may include one or more of the first through fourth examples, the method include where the engine is operated in the torque control mode whenever the engine is operating. In a sixth example that may include one or more of the first through fifth examples, the method further comprises coupling the second electric machine to the engine in an input coupled mode of a transmission. In a seventh example that may include one or more of the first through sixth examples, the method further comprises coupling the second electric machine to a transmission output shaft in an output coupled mode of the transmission.

The method of FIGS. 5 and 6 also provide for a method for operating a driveline, comprising: operating an engine in a torque control mode while switching control modes of a first electric machine and a second electric machine in response to a speed of the first electric machine and a speed of the second electric machine; and transferring electric power between the first electric machine and the second electric machine while the first and second electric machine are not electrically coupled to a battery. In a first example, the method includes where the battery is decoupled from the first and second electric machines via a contactor. In a second example that may include the first example, the method includes where the driveline is included in a vehicle that does not include a traction battery. In a third example that may include the one or both of the first and second examples, the method includes where the control modes include a voltage control mode and a torque control mode. In a fourth example that may include one or more of the first through third examples, the method further comprises not regulating a voltage of a DC voltage bus in response to the speed of the first electric machine being less that a first threshold speed and the speed of the second electric machine being less than a second threshold speed.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines and transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims may be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A driveline, comprising:
a transmission including a first electric machine, a second electric machine, a planetary gear set, and a DC voltage bus;
an internal combustion engine coupled to the transmission; and
a controller including executable instructions stored in non-transitory memory that cause the controller to operate the first electric machine in a first electric machine voltage control mode and the second electric machine in a second electric machine torque control mode in response to a speed of the second electric machine being less than a second threshold speed for voltage regulation of the DC voltage bus and a speed of the first electric machine being greater than a first threshold speed for voltage regulation of the DC voltage bus while operating the internal combustion engine in an engine torque control mode, and wherein the engine is operated in only the engine torque control mode and not in speed control mode for all vehicle speeds and all driver demand torque requests.

2. The driveline of claim 1, further comprising additional instruction to operate the second electric machine in a second electric machine voltage control mode and the first electric machine in a first electric machine torque control mode in response to the speed of the second electric machine being greater than the second threshold speed for voltage regulation of the DC voltage bus and the speed of the first electric machine being less than the first threshold speed for voltage regulation of the DC voltage bus while operating the internal combustion engine in the engine torque control mode, wherein the engine torque is adjusted via an engine actuator including one or more of a throttle, a cam phase adjuster, a fuel injector, and a turbocharger waste gate during the engine torque control mode.

3. The driveline of claim 2, further comprising additional instruction to operate the first electric machine in the first electric machine voltage control mode and the second electric machine in the second electric machine torque control mode in further response to the second electric machine being power limited for voltage regulation of the DC voltage bus.

4. The driveline of claim 3, further comprising additional instruction to operate the second electric machine in the second electric machine voltage control mode and the first electric machine in the first electric machine torque control mode in further response to the first electric machine being power limited for voltage regulation of the DC voltage bus.

5. The driveline of claim 1, further comprising a vehicle that includes the driveline, and where the internal combustion engine is operated in the engine torque control mode while the vehicle is operated at zero speed and at all times when the vehicle is traveling at speeds above zero speed, wherein the engine torque control mode comprises commanding the engine to follow a requested torque.

6. The driveline of claim 1, where the controller is a driveline controller, and wherein the engine is operated in the engine torque control mode in response to an electric energy storage device not being present or coupled to the DC bus.

7. The driveline of claim 6, further comprising and engine controller configured to adjust one or more actuators such that the internal combustion engine generates a torque requested via the driveline controller, and wherein the engine speed increases and decreases during the engine torque control mode.

* * * * *